Figure 4:
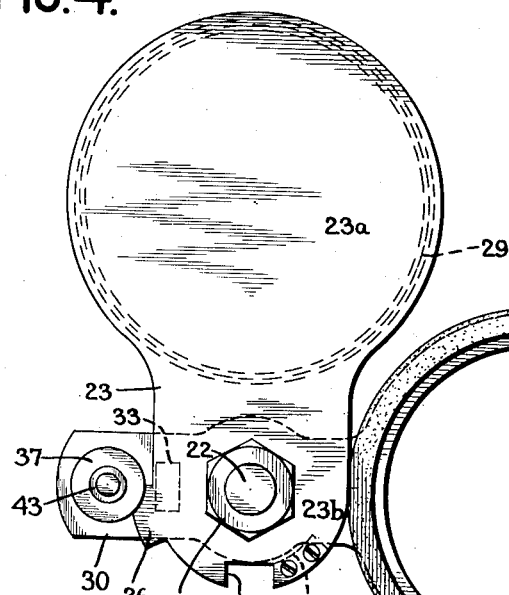

Dec. 5, 1933.    B. F. REMINGTON ET AL    1,938,224
LIQUID SAMPLING DEVICE
Filed June 20, 1931    2 Sheets-Sheet 1
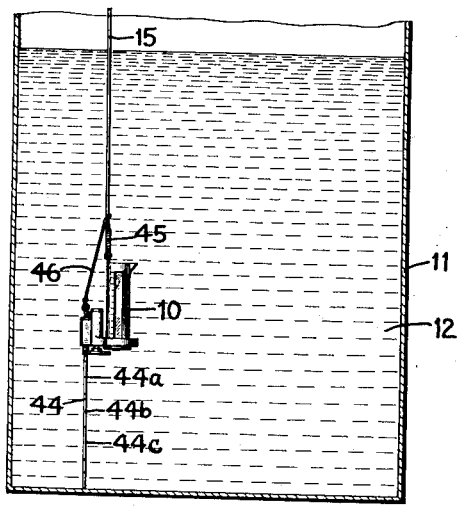
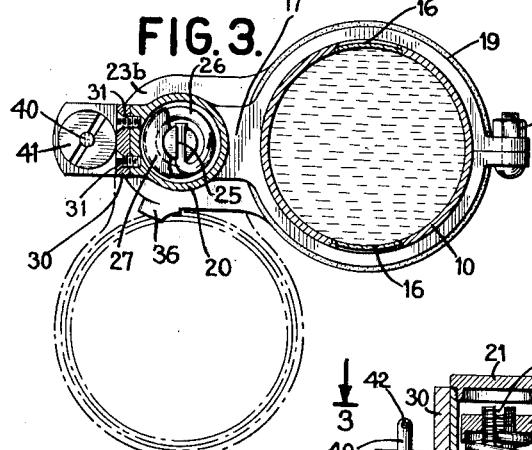
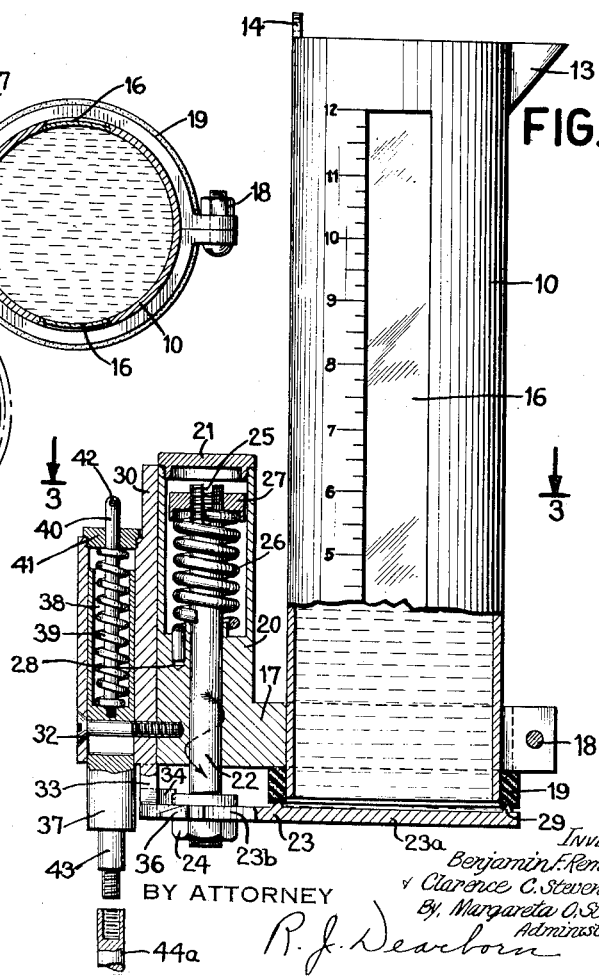
Inventors:
Benjamin F. Remington
& Clarence C. Stevenson, Dec'd.
By, Margareta O. Stevenson,
Administratrix.
R. J. Dearborn
BY ATTORNEY Dec. 5, 1933.   B. F. REMINGTON ET AL   1,938,224
LIQUID SAMPLING DEVICE
Filed June 20, 1931   2 Sheets-Sheet 2

INVENTORS:
Benjamin F. Remington &
Clarence C. Stevenson, Dec'd
By. Margareta O. Stevenson,
Administratrix.

BY ATTORNEY

R. J. Dearborn

Patented Dec. 5, 1933

1,938,224

UNITED STATES PATENT OFFICE

1,938,224

LIQUID SAMPLING DEVICE

Benjamin F. Remington, Wilmington, and Clarence C. Stevenson, deceased, late of Inglewood, Calif., by Margareta O. Stevenson, administratrix, Inglewood, Calif.; said Remington assignor of his right to The Texas Company, New York, N. Y., a corporation of Delaware Application June 20, 1931. Serial No. 545,768

10 Claims. (Cl. 137—18)

The invention relates to fluid samplers and more particularly to those devices used for trapping and withdrawing a sample of a liquid such as oil or the like from a predetermined level in a tank or other receptacle, when it is desired to know the density, color, or other qualities of the liquid at that level.

The principal object of the invention is the provision of a sampling device of this type which is simple in construction and operation and which will serve to hold the liquid sample without leakage.

It is often of considerable importance to know the nature of oil tank bottoms, since over a period of time the accumulation of water, bottom sediment and emulsion becomes stratified and segregated into their respective layers. It is for the purpose of coring these strata and removing the core or samples from the tank without disturbing their respective imposed relationships that this device has been invented. However, it is to be understood that the invention is not limited to the securing of bottom samples, but is designed to remove core samples from any desired vertical level in a tank.

In customary practice a suitable container is lowered into the fluid contents of the storage tank to a predetermined location and a sample of the liquid is then trapped in the container and removed from the tank for examination or analysis. The invention relates to a particular type of trapping mechanism which is more fully described in the following paragraphs.

In carrying out the invention we have provided an elongated, tubular receptacle having a valve seat of rubber or the like secured to the bottom thereof, and having a valve movable first laterally and then vertically for engaging the valve seat when the apparatus has been lowered to a predetermined position in the tank of liquid to be sampled. Other features of the invention include a novel means for draining the receptacle after use, sampling cocks to be used when it is desired to test the liquid at points intermediate the upper and lower ends of the receptacle, and other items which will be brought out in the following description and claims.

Figure 6:
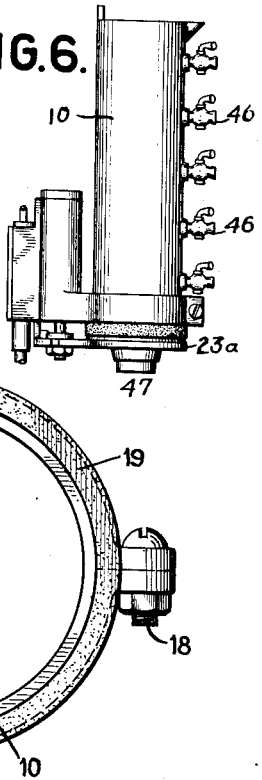
Figure 5:
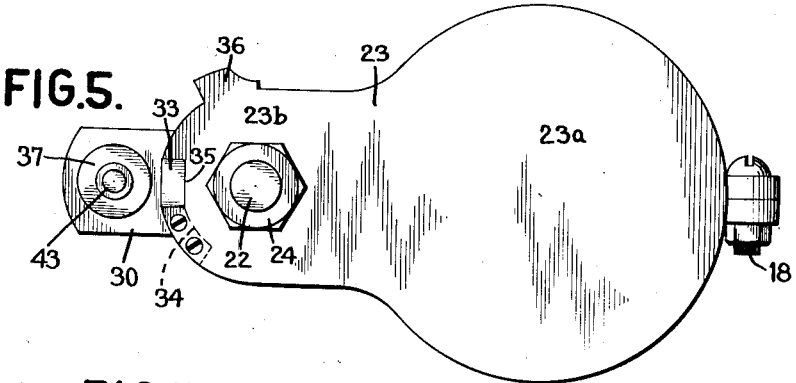
Figure 7:
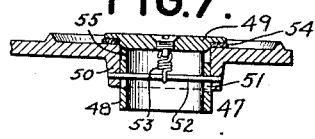

For a better understanding of the invention, reference may be had to the accompanying drawings in which Fig. 1 shows a device embodying the invention in position to take a sample from a tank of liquid; Fig. 2 is a side elevation partly in section of the sampling device; Fig. 3 is a sectional plan view taken on line 3—3 of Fig. 2 looking in the direction of the arrows; Figs. 4 and 5 are bottom plan views of the sampling device showing the valve in open and closed positions respectively; Fig. 6 is an elevation of a slightly modified form, and Fig. 7 is a sectional view of the valve shown in Fig. 6.

Referring to the drawings, we have provided an elongated, tubular receptacle or container 10 adapted to be lowered into a tank 11 containing a liquid 12, such as oil. The container 10 is provided with a pouring spout 13 and also with a projection or eyelet 14, to which a suitable cable 15 may be attached in a manner to be pointed out hereinafter. The container 10 is provided with a pair of oppositely-disposed, vertical, transparent sections or windows 16, through which the liquid within the container may be observed, and preferably, a series of graduations are placed upon the container 10 adjacent one or both of the transparent sections 16 so that the total amount of liquid within the container or the height of any layer or layers of the liquid may be readily observed.

Near the bottom of the container 10 a suitable bracket 17 is secured by means of clamping rings and a suitable bolt 18. At the bottom end of the container 10 an annular resilient member 19 is secured, preferably in a manner such that one edge of the resilient member will extend slightly beyond the end of the tubular container 10, as is shown clearly in Fig. 2. This annular member 19 is preferably formed of a comparatively soft and resilient substance such as rubber and serves as a seat for the valve which closes the lower end of the container. The bracket 17 is provided with an upstanding portion 20, the upper end of this portion being hollow and provided with a suitable closure member such as the cap 21. Rotatably and slidably mounted in the portion 20 of bracket 17 is a stem 22, and at the lower extremity of this stem is secured the valve 23 by means of a suitable nut 24. The valve 23 is thus pivotally mounted to oscillate about an axis parallel to the axis of the container 10. The upper end of the stem 22 is provided with a slot 25 which serves to hold one end of a coil spring 26. A threaded washer 27 presses the upper end of the spring 26 tightly into the slot 25 and the other end of the spring is secured in a small hole 28 in the portion 20 of the bracket 17. When the spring 26 is placed in position, it is compressed slightly and given a small torque so that the stem 22 and valve 23 will be biased in an upward direction, and also in a counter-clockwise direction, as shown in Fig. 3. The oscillatable valve 23 is formed of a substantially circular portion 23a and a side portion 23b, as shown more clearly in Figs. 4 and 5, and one surface of the circular portion 23a is provided with an annular knife-edged projection 29 which is adapted to engage the resilient valve seat 19 and so tightly close the lower end of the container 10 when in the position shown in Fig. 2.

On one side of the upstanding portion 20 of the bracket 17 a second bracket 30 is secured by means of suitable screws 31 and 32. At the lower end of the bracket 30 a downwardly-projecting member or finger 33 is formed and this finger cooperates with a stop lug 34 suitably secured to the periphery of the valve portion 23b to prevent lateral movement of the valve in a counterclockwise direction beyond the closed position, i. e., the position of the valve shown in full lines in Fig. 3. The periphery of the side portion 23b of the valve 23 is also provided with a slot 35 slightly larger than the projecting finger 33 and located so that when the valve 23 is in the closed position the finger 33 will enter the slot 35 and allow the coil spring 26 to force the valve stem 22 and valve 23 upwardly to the fully closed position, in which the knife-edged projection 29 will engage the resilient valve seat 19. It will be observed that when the valve 23 is in any position other than that directly below and in alignment with the container 10, the end of the finger 33 will engage the upper surface of the side portion 23b to hold the valve 23 in a horizontal plane slightly below that shown in Fig. 2. In other words, when the valve 23 moves from the position shown in dotted lines in Fig. 3 toward the closed position, the finger 33 bearing against the upper surface of the valve portion 23b will hold the valve 23 in a slightly lower position until the slot 35 comes in alignment with the finger 33, and at that moment the spring 26 will move the valve upwardly to its tightly closed position.

In order to hold the valve 23 temporarily in its open position, while the device is being lowered in a tank of fluid to be sampled, we have provided a lug 36 formed on and projecting from the edge of the valve portion 23b and latch mechanism for engaging the lug 36 to hold the valve in the position indicated in Fig. 4. This latch mechanism comprises a member 37 slidably mounted in the bracket 30 and provided with a hollow portion 38 which serves to house a coiled compression spring 39. A short stem 40 is threaded at one end into the member 37 and extends upward through the spring 39 and a cap 41 secured to the bracket 30. A suitable hook or eyelet 42 is formed at the upper end of the stem 40 for attachment to a cable to be used in tripping or disengaging the latch mechanism in order to close the valve at a desired position in the tank. The latch mechanism may also be actuated directly through engagement with the bottom of the tank, and to this end the slidable latch member 37 has formed at its lower end a threaded projection 43, and to this projection 43 may be secured a rod 44 formed of a plurality of sections 44a, 44b, 44c, etc., the purpose of the rod 44 being to engage the bottom of the tank 11 when the container 10 has been lowered to a desired position as shown in Fig. 1. The rod 44 in engaging the bottom of the tank 11 will force the slidable latch member 37 upwardly and out of engagement with the lug 36, whereupon the spring 26 will move the valve 23 to its closed position, as pointed out hereinbefore.

It is obvious that the rod 44 may be given any length simply by adding more or less sections.

If it is desired to take a sample of the liquid from the extreme bottom of the tank, the extension rod 44 will not be used, and the container 10 will then be lowered until the projection 43 of the latch member 37 engages the bottom of the tank, whereupon the lug 36 will be disengaged and the valve 23 will be moved to its closed position.

A coil spring 45 is preferably attached between the cable 15 and the eyelet 14 on the container 10 and a short cable 46 is attached to the lower end of the cable 15 and to the eyelet 42 at the upper end of the rod 40. If it is desired to take a sample of liquid from a point so high in the tank that it would be inadvisable to use the extension rod 43a, it is only necessary to give the suspending cable 15 a slight tug or jerk in order to pull the rod 40 and the latch member 37 upwardly so that the spring 26 will close the valve 23. When such a jerk is given to the cable 15, the spring 45 will extend slightly, due to the inertia of the container 10, and the container itself will not be moved. The suspending cable 15 may be suitably marked at intervals so as to indicate at the surface the depth at which the receptacle 10 is positioned.

In instances such as where the tank of liquid to be sampled is relatively shallow, it may be desirable to examine the sample of liquid in the receptacle 10 at a point or points intermediate the upper and lower ends thereof, and to this end we have provided the receptacle with a plurality of vertically spaced sampling cocks 46 as shown in Fig. 6. By opening one of the cocks 46 the liquid at a desired level may be readily withdrawn for examination and analysis.

In order to conveniently discharge the contents of the sampler into a receiving can or receptacle we have provided a secondary valve 47 shown in Figs. 6 and 7. The valve 47 is formed in the enlarged portion 23a of the main or trap valve 23 and comprises a short cylinder 48 having a disc-like top 49 which is adapted to normally close an opening in the main valve 23a. The main valve portion 23a is provided with a depending cylindrical portion 50 within which slides the cylinder 48. The cylinder 48 is provided with a pair of oppositely disposed slots 51 and a rod or bar 52 secured to the depending portion 50 and passing through the slots 51 serves as a fixed support for one end of a short coil spring 53, the other end of which is attached to the disc 49. A suitable packing ring 54 is secured to the cylinder 48 directly under the edge of the disc 49 and forms a liquid-tight joint when the valve 47 is closed. The upper part of the cylinder 48 is provided with a plurality of slots or openings 55 through which the liquid may flow when the valve 47 is open, i. e. in its upper position. Thus it will be evident that in order to drain the sampler it is merely necessary to push the valve cylinder 48 upwardly or to rest the lower edge of the cylinder 48 on the edge of a receptacle whereupon the valve will be forced upwardly and the contents drained into the receptacle.

While we have described our invention as embodied in concrete form and capable of being used in a specific manner in accordance with the provisions of the patent statutes, it should be understood that we do not limit our invention thereto, since various modifications thereof will suggest themselves to those skilled in the art without departing from the spirit of our invention,

We claim:

1. In a device for extracting representative samples from a substance, a tubular container, a valve oscillatable about an axis parallel to the container axis for closing the lower end of said container, means for temporarily holding said valve in its open position, and means operable at will be moving said valve first laterally and then vertically to its closed position.

2. In a device for extracting representative samples from a tank of liquid, an elongated container, a valve seat secured to the lower end of said container and formed of a resilient material, a valve pivotally mounted at one side of said container so as to swing laterally of said container, spring means for moving said valve from its open position to a second position below said container, and means for moving said valve vertically from said second position to a position in engagement with said valve seat.

3. In a fluid sampling device, a container adapted to be lowered into a fluid to be sampled, a valve oscillatable about an axis parallel to the axis of said container for closing one end of said container, means for holding said valve in an open position, means for disengaging said holding means, and spring means for moving said valve first in a lateral and then in a longitudinal direction to close the end of said container.

4. In a device for extracting representative samples from a substance, a container having openings in the top and bottom thereof, a valve oscillatable about an axis parallel to the container axis, a resilient valve seat secured to the bottom of said container, means for forcing said valve first in a lateral and then in a vertical direction to engage said resilient seat, and means for temporarily retaining said valve in an open position.

5. In a fluid sampling device, a tubular container adapted to be lowered in the fluid to be sampled, a bracket secured to the lower portion of said container, a stem mounted in said bracket so as to be rotatable and slidable on an axis parallel to the axis of said container, a valve secured to one end of said stem and comprising a substantially circular portion and an extending side portion, said side portion being provided with a peripheral slot, a projecting member secured to said bracket and arranged to hold said valve away from said container when said valve is in its open position and to cooperate with said slot to permit the circular portion of said valve to engage the end of said container when in the closed position, and spring means for biasing said valve toward its closed position.

6. In a fluid sampling device, a tubular container adapted to be lowered vertically into a tank of fluid to be sampled, a cable from which said container is suspended, a valve for closing the lower end of said container at a predetermined position in said tank, means for temporarily holding said valve open while said container is being lowered, and means for disengaging said holding means comprising a second cable secured to said holding means and to the lower end of said first mentioned cable.

7. In a fluid sampling device, a tubular container adapted to be lowered vertically into a tank of fluid to be sampled, a cable from which said container is suspended, a valve for closing the lower end of said container at a predetermined position in said tank, means for temporarily holding said valve open while said container is being lowered, comprising a lug secured to said valve and a latch member for engaging said lug, means for disengaging said holding means comprising a second cable secured to said latch member and to the lower end of said first mentioned cable and a tension spring attached to the lower end of said first mentioned cable and to said tubular container.

8. In a fluid sampling device, a tubular container adapted to be lowered into a liquid to be sampled, an annular valve seat on the lower end of said container, a trap valve pivotally mounted to swing laterally of said container to engage said valve seat, and a drain valve formed in said trap valve and normally biased to a closed position, said drain valve comprising a downwardly extending cylindrical portion and a disc-like end portion for closing the opening in said trap valve.

9. In a fluid sampling device, a tubular container adapted to be lowered vertically into a tank of fluid to be sampled, a cable from which said container is suspended, a valve for closing the lower end of said container at a predetermined position in said tank, means for temporarily holding said valve in an open position while said container is being lowered into said fluid, and means attached to the lower end of said cable for disengaging said holding means, said disengaging means including a second cable secured at one end to said holding means.

10. In a fluid sampling device, a tubular container adapted to be lowered into a tank of fluid to be sampled, a cable from which said container is suspended, a valve for closing the lower end of said container at a predetermined position in said tank, means for holding said valve open while said container is being lowered, said means comprising a latch device attached to said container, means for tripping said latch device so as to disengage said holding means comprising a second cable secured to said latch device and to the lower end of said first mentioned cable, and a spring member secured to the lower end of said first mentioned cable and to said tubular container.

BENJAMIN F. REMINGTON.
MARGARETA O. STEVENSON,
*Administratrix of the Estate of Clarence C. Stevenson, Deceased.*